June 19, 1951     J. K. McFADDEN     2,557,609
HUB BOLT RETHREADING AND PEENING TOOL
Filed April 1, 1947
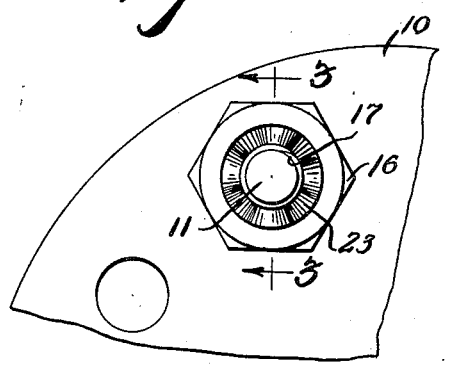
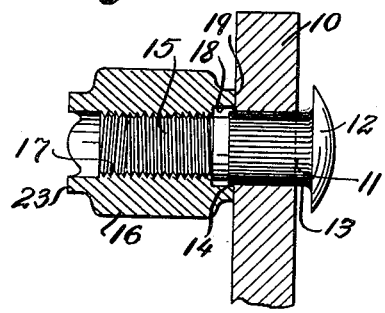
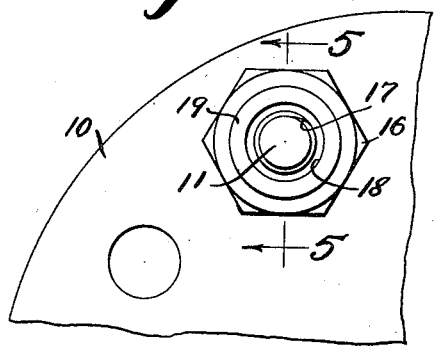
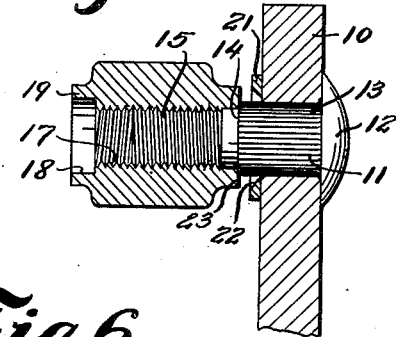
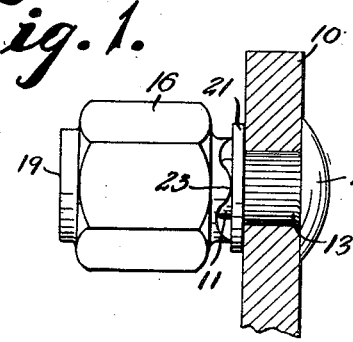
INVENTOR.
John K. McFadden
BY Victor J. Evans & Co.
ATTORNEYS Patented June 19, 1951

2,557,609

UNITED STATES PATENT OFFICE 2,557,609

HUB BOLT RETHREADING AND PEENING TOOL

John K. McFadden, Manhattan Beach, Calif.

Application April 1, 1947, Serial No. 738,678

2 Claims. (Cl. 78—1)

This invention relates to a hub bolt rethreading and peening tool.

It is an object of the present invention to provide a tool whereby a hub bolt may be peened into a countersunk flange by as simple an operation as turning the tool on the threaded portion of the splined bolt.

Other objects of the present invention are to provide a simple tool for effecting rethreading and peening operations upon a splined bolt, which is inexpensive to manufacture and which is efficient in operation.

For other objects and for a better understanding of the invention, reference may be had to the following detailed description taken in connection with the accompanying drawing, in which Fig. 1 is a side elevational view of the tool fitted on a bolt after the peening operation has been perfected upon the shoulder of the bolt.

Fig. 2 is a plan view looking upon the peening portion of the tool.

Fig. 3 is a cross-sectional view taken on line 3—3 of Fig. 2.

Fig. 4 is an end elevational view looking upon the opposite end of the tool as fixed in place to put the bolt in place.

Fig. 5 is a cross-sectional view taken on line 5—5 of Fig. 4.

Fig. 6 is a similar cross-sectional view after the tool has been drawn over the threaded portion to the maximum extent and the shoulder has been peened into the countersunk flange.

Referring now to the figures, 10 represents a hub or flange into which there is to be extended a series of bolts 11. The bolts 11 are provided with an arm head 12 and a splined portion 13 adapted to extend in tight engagement with the wall of the opening through which the bolt is extended. The splined portion has a shoulder 14 adapted to extend beyond the opposite side of the hub or plate 10 from the rounded head portion 12. On threaded portion 15 of the bolt 11, there is fitted a tool 16 embodying the features of the present invention. This tool has a threaded opening 17 extending axially therethrough for engagement with the threaded portion 15 on the bolt. When the tool is applied as shown in Fig. 3, the bolt will be drawn through the opening in the plate 10 so that the rear face of the head 12 will be placed in flush engagement with the face of the plate. In order to receive the splined portion 13 the tool is provided with a recess 18 of larger diameter than the threaded opening 17. The tool 16 will have its forward end face 19 engaged with the surface of the plate about the splined portion 13 and as the tool is turned the splined portion 13 will be drawn through the plate so that its end will fill the recess 18.

Thereafter the tool 16 is removed from the threaded portion 15 of the bolt and reversed so as to apply a peening forming end in engagement with the shoulder 14 as shown in Fig. 5. Before again applying the tool 16 a countersunk flange 21 is placed over the splined portion 13. This flange has a countersunk opening 22. The peen forming projections of the tool are shown at 23 and they act upon the shoulder 14 to upset the same and cause the material to be forced into the countersunk opening 22 to form a flange 24 upon the bolt 11. The diameter of the opening at the peening end of the tool is the same as that of the threads. Accordingly the bolt 11 will be made fast to the plate 10.

There are four different peening projections 23 on the tool 16. These projections are separated by grooves and the projections are rounded at the forward ends so that upon turning the tool the material will be rolled into the countersunk opening 22 of the flange 21. The bolt 11 will accordingly be retained in the plate 10 in a rivet-like manner. The exterior diameter of the tool 16 is greater along its intermediate portion where a wrench will be applied than at the opposite ends bearing the recess 18 and the peening projections 23. The tool is of hexagonal section so that it can be operated by a standard wrench.

Upon fitting the tool onto the threaded portion 15, the bolts will be rethreaded at the same time that the tool is being used to pull the bolts through the plate 10 or to upset the shoulder portion 14.

While various changes may be made in the detail construction, it shall be understood that such changes shall be within the spirit and scope of the present invention as defined by the appended claims.

I claim:

1. In a peaning tool for a bolt having a shank, a head at one end of the shank and a threaded portion extended from the opposite end and axially aligned with the shank, the outside diameter of said threaded portion being less than that of the shank providing a shoulder between the said threaded portion and shank, and said shank having a washer with a countersunk opening therein positioned thereon, the combination which comprises a nut having a threaded bore with flat wrench gripping areas on the outer surface and having a collar with a corrugated surface including arcuate wavy formations on the outer end carried by an end of the nut, whereby with the nut threaded on the said threaded portion of the bolt and with the shank of the bolt positioned in an opening in a plate the thickness of which is less than the length of the shank, and with the washer on the shank and positioned against the outer surface of the plate with the countersunk end of the opening extended outwardly the corrugations pean the shoulder of the bolt into the countersunk end of the opening of the washer as the nut is screwed toward the plate.

2. In a peening tool for a bolt having a splined shank portion and a threaded shank portion, the splined shank portion being larger diametrically than the threaded shank portion and greater axially than the thickness of the part through which it is to be passed whereby to provide a shoulder, said tool comprising a hollow body having an internal thread similar to that of the threaded portion of the shank and having flat outer sides, an annular series of relatively spaced peening projections on one end of the body for peening the material of the shoulder against the surface of the part through which the splined portion of the shank of the bolt extends when the body is turned on the bolt in the direction of said bolt, said peening projections extend longitudinally from the body and having unthreaded inner sides spaced radially of the threaded shank portion and having smooth convex active faces.

JOHN K. McFADDEN.

REFERENCES CITED

The following references are of record in the file of this patent:

UNITED STATES PATENTS

| Number | Name | Date |
|---|---|---|
| 240,387 | Cowdy | Apr. 19, 1881 |
| 759,834 | Steele | May 10, 1904 |
| 868,067 | Berry | Oct. 15, 1907 |
| 1,067,755 | Price | July 15, 1913 |
| 1,355,373 | White | Oct. 12, 1920 |
| 1,986,980 | Ross | Jan. 8, 1935 |